United States Patent [19]

Felton et al.

[11] 3,959,510

[45] May 25, 1976

[54] BEVERAGE CLOUDING AGENTS BASED ON NATURAL GUM RESINS

[75] Inventors: Stephen M. Felton, New Brunswick, N.J.; Ira B. Kapp, Riverdale, N.Y.

[73] Assignee: Ira B. Kapp, Riverdale, N.Y.

[22] Filed: Sept. 11, 1974

[21] Appl. No.: 504,946

Related U.S. Application Data

[63] Continuation-in-part of Ser. No. 290,055, Sept. 18, 1972, abandoned.

[52] U.S. Cl. ............................... 426/548; 426/590; 426/592; 426/650; 426/651
[51] Int. Cl.² ............................................ A23L 1/22
[58] Field of Search ........... 426/190, 192, 365, 366, 426/223, 590, 650, 651, 592; 252/311, 310, 312

[56] References Cited

UNITED STATES PATENTS

| | | | |
|---|---|---|---|
| 1,500,670 | 7/1924 | DeGroote | 426/366 |
| 3,353,961 | 11/1967 | Simon | 426/190 |
| 3,660,105 | 5/1972 | Kesterson et al. | 426/190 |

*Primary Examiner*—Robert L. Lindsay, Jr.
*Assistant Examiner*—Peter Chin
*Attorney, Agent, or Firm*—Blum, Moscovitz, Friedman & Kaplan

[57] ABSTRACT

New combinations of essential oils, vegetable oils and natural and synthetic flavor oils with edible natural oil-soluble gum resins both in crude form and in purified form are described. The gum resins have densities sufficiently greater than 1.00 so that the solutions of the gum resins in the oils can be suspended as a dispersion in aqueous solution to yield stable, cloudy beverages simulating both the appearance and taste as well as pulpy mouth-feel of the natural juices themselves. The solutions of natural gum resins in flavor oils can also be dispersed in alcohol-water solution to form stable, cloudy alcoholic beverages.

29 Claims, 1 Drawing Figure

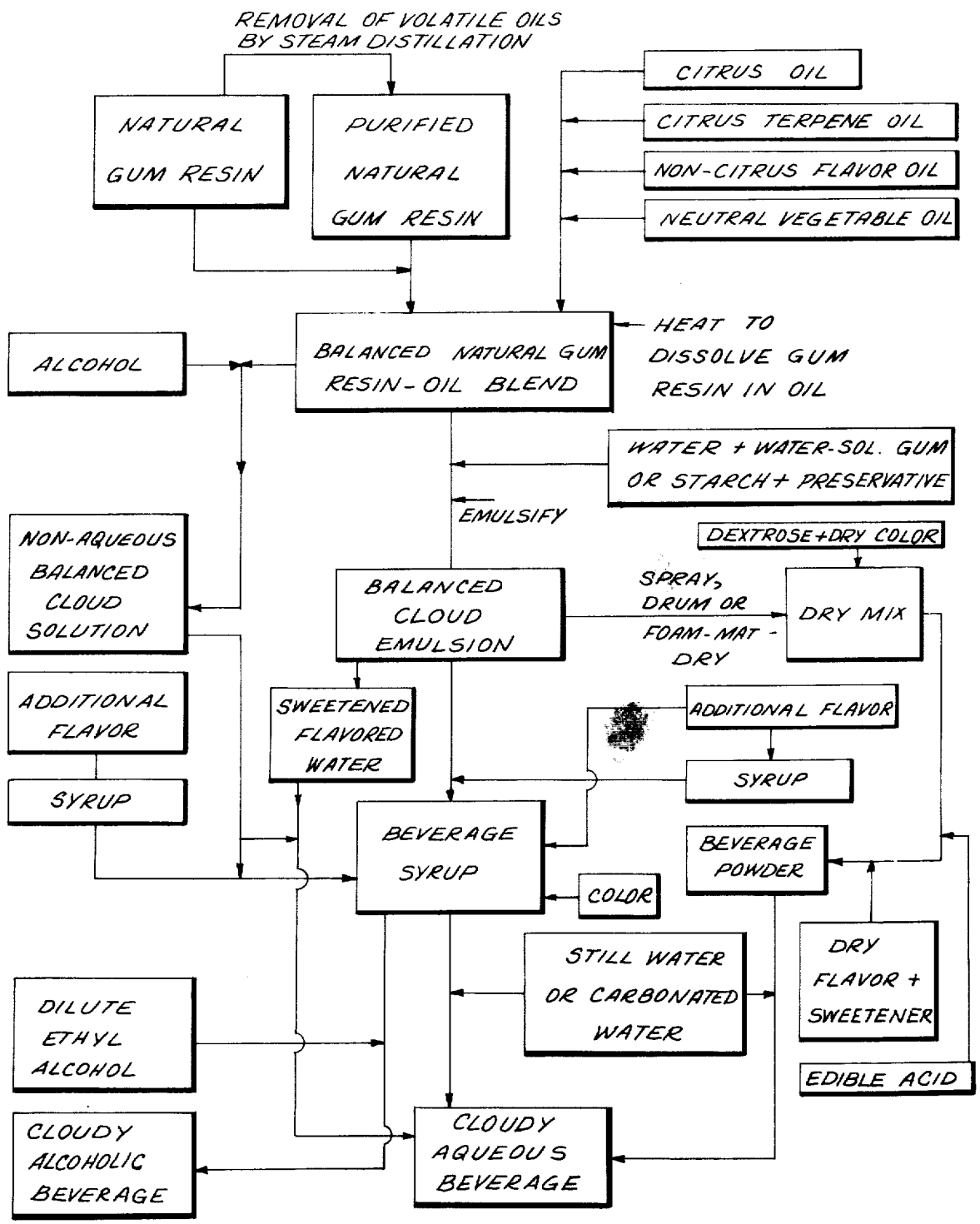

BEVERAGE CLOUDING AGENTS BASED ON NATURAL GUM RESINS

CROSS REFERENCE TO RELATED APPLICATION

This application is a Continuation-In-Part application of our co-pending patent application Ser. No. 290,055, filed Sept. 18, 1972 entitled BEVERAGE CLOUDING AGENTS BASED ON NATURAL GUM RESINS and now abandoned.

BACKGROUND OF THE INVENTION

For many years, brominated oils of specific gravity greater than 1.00 g/ml have been used in combination with flavor oils or vegetable oils to yield a balanced oil blend, i.e., one having a density close to that of the beverage base in which it is to be suspended. A balanced oil dispersed in a beverage base having the same density yields a stabilized, non-ringing, cloudy beverage. This is particularly true with citrus oils, which, being highly insoluble in beverage bases, would float to the top unless balanced with a high density oil-soluble material such as brominated vegetable oil. The dispersion of the balanced oil in the aqueous solution has a cloudy appearance which is desirable in terms of consumer appeal.

It has been announced that brominated vegetable oils may have toxic effect, as a result of which the F.D.A. has limited its use to 15 ppm in finished drinks; this is about 10% of the concentration formerly used. As a substitute for brominated vegetable oils, the industry generally turned to another oil-soluble material of density greater than 1.00 g/ml that was approved for food use. The material was glyceryl abietate, generally termed Ester Gum. Although glyceryl abietate accomplishes the same purpose as brominated vegetable oil, namely stabilization and clouding, it has a number of deficiencies; (1) Since its specific gravity is 1.08 as compared to approximately 1.30 for brominated vegetable oils, a much greater amount of Ester Gum, namely, about three times as much, must be used to achieve the same degree of balancing. The resultant taste possesses a bitter character. (2) Although both glycerol and abietic acid are natural products, Ester Gum is nevertheless a synthetic material which precludes its use in those products which the producer wants to label as natural.

What is needed then, is a natural, oil-soluble resin which has a density sufficiently greater than 1.00 so that it is useful for balancing purposes and which is sufficiently free of unpleasant taste so that it may be used in the necessary proportions for balancing any flavor or vegetable oils to be used in an intended beverage.

SUMMARY OF THE INVENTION

The invention comprised flavor oils, both natural and synthetic, vegetable oils, and potable materials such as citrus terpene oil in combination with one or more edible natural oil-soluble gum resins derived from plants and having a specific gravity greater than 1.00 g/ml, the combination having a density lying in the range between 0.98 and 1.04 g/ml. Suitable oil-soluble gum resins include damar, colophony, Canada balsam, elemi, copaiba, galbanum, labdanum, myrrh, olibanum, opopanax, Peruvian balsam, sandarac, storax, tolu balsam, gurgun balsam and mastic. In general, flavor is improved by purification of the gum resin. Purification consists of removal of volatile oils.

The combination is intended for use in the preparation of still and carbonated beverages which may be aqueous or alcoholic. A plurality of routes from gum resin-oil blends to the final beverage are available. The present invention encompasses (1) the solutions as described, (2) a balanced cloud emulsion made from the combination either by addition of water, a water-soluble gum or starch, with or without preservative, or by addition of water and alcohol, (3) a dry mix prepared by drying the balanced cloud emulsion, (4) a beverage powder consisting of a dry mix and added flavor, (5) a beverage syrup prepared by the addition of syrup and, optionally, additional flavor and (6) the final beverage in any of the four forms, namely still or carbonated, alcoholic or non-alcoholic.

Accordingly, an object of the present invention is to provide an improved edible natural gum resin-oil blend suitable for use in the preparation of cloudy beverages.

Another object of the present invention is to provide an improved balanced cloud emulsion suitable for use in the preparation of cloudy beverages.

A further object of the present invention is to provide an improved dry mix for the preparation of cloudy beverages.

An important object of the present invention is to provide an improved beverage syrup for use in the preparation of cloudy beverages.

A particularly significant object of the present invention is to provide processes for preparing the above compositions and for converting them into cloudy citrus and non-citrus flavored beverages which may be still or carbonated, and alcoholic or aqueous.

Still other objects and advantages of the invention will in part be obvious and will in part be apparent from the specification.

The invention accordingly comprises the several steps and the relation of one or more of such steps with respect to each of the others, and the compositions possessing the features, properties and the relaton of constituents which are exemplified in the following detailed disclosure, and the scope of the invention will be indicated in the claims.

BRIEF DESCRIPTION OF THE DRAWING

For a fuller understanding of the invention, reference is had to the following description taken in connection with the accompanying drawing, in which:

The single FIGURE shows diagrammatically the process steps and compositions through which the raw materials pass in the production of cloudy, flavored beverages in accordance with the present invention.

DESCRIPTION OF THE PREFERRED EMBODIMENTS

Natural, edible oil-soluble gums suitable for use in balancing natural and synthetic flavor oils and neutral edible oils include damar, colophony, Canada balsam, elemi, copaiba, galbanum, labdanum, myrrh, oliganum, opopanax, Peruvian balsam, sandarac, storax, tolu balsam and mastic. A number of the gum resins may be used as obtained from the corresponding plants or in purified form, but the remaining gum resins are used only after removal of volatile oils as by steam distillation or other conventional means. In all cases, the flavor is improved by removal of such volatile oils. The gun resins as used have densities between 1.04 and 1.10. The densities vary slightly from one resin to another and also from sample to sample of the same resin.

The particular advantages in the use of these gum resins, and in particular the purified gum resin derived from gum elemi are: (1) They provide highly stabilized beverages that do not form rings or precipitate and do not oil out. (2) They form highly dense stable clouds in the finished beverage. (3) They are natural plant materials which need not be and are not subjected to any type of chemical reaction prior to use. (4) Densities are high enough so that large quantities are not needed to give the desired balancing effect, and, in the quantities used do not adversely affect the flavor of the beverages in which they are used.

Of the natural gum resins specified, elemi, damar, colophony and Canada balsam have been found to have the most desirable combinations of properties and characteristics, particularly with regard to flavor. Of these four resins purified elemi is considered best based on extensive flavor testing.

Various process steps by which natural, oil-soluble gum resins are combined with flavor bodies to yield a cloudy beverage with a pulpy mouthfeel are shown in the flow diagram.

As shown in the flow diagram, the natural gum resin as derived from the plant can be used in that form if free of off-taste or bitterness but otherwise is first purified by steam distillation or by other conventional methods to improve the taste of the final beverage. The gum resin or purified gum resin is combined with one or more of citrus oil which may be either synthetic or natural, citrus terpene oil, synthetic or natural non-citrus flavor oil or neutral oil, preferably using heat and agitation. In general, depending upon the proportions of gum resin and oil it is not necessary to heat the combination beyond about 170°F to effect solution of the gum resin in the oil forming a natural gum resin-oil blend. On cooling, the natural gum resin-oil blend may set to a gel. The product, as shown in the flow diagram, is a balanced natural gum resin-oil blend.

For most purposes, the natural gum resin-oil blend is converted to an emulsion termed a "balanced cloud emulsion" by emulsifying with water, a preservative, and a water-soluble gum or starch which acts as the stabilizing agent. Alternatively, the natural gum resin-oil blend may be taken up in an alcohol such as ethyl alcohol, propylene glycol, or glycerol to form a balanced cloud solution or dispersion which may be used in a manner similar to that in which the balanced cloud emulsion is used.

The balanced cloud emuslion may be dried by spray, freeze drum, or Foam-mat drying to form a dry mix having a moisture content no higher than about 5%. This dry mix may be stored and shipped as a base for use in preparing the final beverage. Another method of using the balanced cloud emulsion is to mix it with syrup (either sugar in water or artificial sweetener in water), and optionally with additional flavor and/or edible acid to prepare a beverage syrup. The beverage syrup is converted into the final cloudy beverage by addition of still or carbonated water or by the addition of ethyl alcohol of suitable proof.

The dry mix obtained from the balanced cloud emulsion is preferably mixed with a solid edible acid such as citric, tartaric, or malic, dextrose, dry color and a dry flavor and sweetener to form a beverage powder. This powder is suitable for storage and shipping since it needs only the addition of water to form the final cloudy beverage.

The balanced cloud emulsion stage can be skipped when the blend is in solution in an alcohol forming a balanced cloud solution. When the process is to be carried out in this fashion, the solution or dispersion of the natural gum resin-oil blend in an alcohol is added to syrup which optionally may have additional flavor added thereto to form a beverage syrup. This beverage syrup is then used as described above to produce either cloudy aqueous beverages or cloudy alcohol beverages.

It is also possible to convert the balanced cloud emulsion directly to a cloudy aqueous or alcoholic beverage by adding sweetened flavored water or alcohol of suitable proof, thus skipping the beverage syrup stage.

As is evident from the above description of the process steps and the intermediate compositions, the most useful compositions with respect to storage, shipping and vending to beverage processors are the natural gum resin-oil blend, the balanced cloud emulsion, the balanced cloud solution, the dry mix, the beverage powder, and the beverage syrup. Naturally, it is also possible to vend products based on the above-listed gum resins in the form of cloudy aqueus or alcoholic beverages which may be either still or carbonated. Furthermore, since a cloud-forming composition may be intended for use with an aqueous or an alcoholic solution sweetened with varying quantities of sugar or with an artificial sweetener or combinations thereof, it is necessary to provide for the production of compositions which vary in density from about 0.98 to about 1.04 g/ml. Consequently, with a number of the examples which follow, ranges are also specified. All quantities are in parts by weight.

Because of the fact that elemi gum resin has been found to be preferred commercially on the basis of taste and cost, the Examples presented are based on this gum resin. However, the invention is not to be regarded as limited to elemi gum resin since the other resins of the aforelisted group may be similarly employed, making suitable compensation for differences in density and intensity of flavor. Furthermore, different gum resins may be combined to provide special flavor combinations. The gum resins may be blended as such or at the balanced cloud emulsion stage or at other stages of the various processes indicated in the FIGURE.

EXAMPLE 1

Purified Elemi gum resin (677 parts) from which the volatile oil has been removed by steam distillation and of specific gravity of 1.08 is dissolved in 333 parts of orange terpenes of specific gravity 0.84 by agitating the mixture of 170°F. When a homogeneous viscous liquid is obtained solution has occurred. Upon cooling to room temperature the solution becomes a plastic mass of specific gravity 1.01. The product is a balanced gum resin-oil blend.

Range

500–700 purified Elemi gum resin
250–500 orange terpened.

EXAMPLE 2

Purified Elemi gum resin (700 parts) and 300 parts of vegetable oil of specific gravity 0.86 is agitated and heated at 170°F to form a viscous solution of specific gravity 1.02. The product is a gum resin-oil blend.

Range

600–750 purified Elemi gum resin
250–400 vegetable oil

EXAMPLE 3

To 642 parts of purified Elmi gum resin is added 220 parts Lemon Oil California USP, 83 parts Lemon Oil Distilled and 55 parts Lemon Oil 5-Fold. This mixture is heated at 170°F to form a solution of specific gravity 1.01. The product is a gum resin-oil blend.

| Range: | Purified Elemi gum resin | 350–750 parts |
|---|---|---|
| | Lemon Oil | 150–600 parts |
| | Lemon Distilled | 20–120 parts |
| | Lemon 5X | 10–80 parts |

EXAMPLE 4

Gum Arabic (230 parts) is dissolved in 619 parts of water containing 1 part of sodium benzoate as preservative. To this solution with agitation is added 150 parts of a gum resin-oil blend from Example 1. Such blends are also referred to as balanced oil blends. This mixture is thoroughly mixed, then homogenized in a 2 stage pressure homogenizer or a colloid mill to a particle size range of 0.5 to 1.5 microns. The product is a balanced cloud emulsion.

Range

50–200 parts balanced oil blend
180–300 parts Gum Arabic
450–650 parts Water
1–10 parts Preservative.

EXAMPLE 5

Same as Example 4 except that Purity Gum BE (a modified dextrin from waxy maize made by National Starch Co. is substituted for the gum Arabic).

| Range: | 50–200 Balanced Oil Blend | 150 parts |
|---|---|---|
| | 90–200 Purity Gum BE | 110 parts |
| | 550–750 Water | 739 parts |
| | 1–10 Preservative | 1 part |

EXAMPLE 6

1 oz. of balanced cloud emulsion is mixed with 1 gallon of sugar syrup of 28° to 32° Baume. If acid is desired 1 oz. of 50% citric acid may be added. The product is a beverage syrup.

| Range: | ¼–2 ozs. | Cloud Emulsion |
|---|---|---|
| | 1 gallon | 28–32 Baume Syrup |
| | 0–1½ ozs. | 50% citric acid |

EXAMPLE 7

1 part of beverage syrup such as that of Example 6 is diluted with 5 parts of water or carbonated water to form a beverage.

Range 1 part beverage syrup
4–6 parts water or carbonated water

EXAMPLE 8

50 parts of a balanced oil blend from Example 1 is dispersed in 950 parts of 95% ethyl alcohol by agitation at room temperature. The product is a non-aqueous balanced cloud solution.

Range

50–100 parts of balanced oil blend
900–950 parts of 95% Ethyl Alcohol

EXAMPLE 9

1 part of beverage syrup such as that of Example 6 is diluted with 32 proof alcohol. The product is a cloudy alcoholic beverage.

Range 1 part beverage syrup
3–6 parts 32 proof alcohol
0–3 parts of water

EXAMPLE 10

To 1 gallon of syrup is added 2 ozs. of the balanced dispersion of Example 8. The product is a beverage syrup.

Range

Balanced dispersion 1 to 4 ozs.
Syrup 28032 Baume 1 gallon
0–1 1/2 ozs. 50% citric acid.

EXAMPLE 11

A balanced cloud emulsion prepared as defined in Example 4 is spray dried to a powder with an average water content of 5%.

EXAMPLE 12

A beverage powder is prepared from the spray dried balanced cloud emulsion of Example 11 as follows:

0.20 g. Carboxy Methyl Cellulose
6.00 g. Sugar
3.00 g. Citric Acid
0.05 g. FDC Yellow No. 6 10% in starch
0.05 g. FDC Yellow No. 5 10% in starch
0.40 g. Spray Dried Balanced Cloud Emulsion
0.20 g. Sodium Citrate
0.35 g. Spray Dried Orange Flavor
20.00 g. Cerelose
30.25 g.

85 g of the above beverage powder when dissolved in 1 quart of water constitutes a cloudy finished drink.

Ranges in this Example are not given because of the tremendous number of possible compositions.

EXAMPLE 13

To 85 g of a beverage powder as described in Example 12 is added 1 quart of water, either still or carbonated. The product is a cloudy beverage.

Range

8–16 ozs. beverage powder
1 gallon of water or carbonated water

EXAMPLE 14

To 6 gallons of sugar-sweetened flavored still or carbonated water is added 1 oz. of balanced cloud emulsion prepared as in Example 4. The product is a cloudy beverage.

Range

Balanced cloud emulsion ¼ to 2 oz.
Sweentened flavored water 5 to 7 gallons

EXAMPLE 15

The following is a list of natural oil-soluble gum resins usuable in accordance with the present invention with literature sources describing same incorporated by reference. The references are:

1. Handbook of Flavor Ingredients (HFI) by Thomas E. Furia & Nicolo Bellanco, Published by Chem. Rubber Co., 1971.
2. Perfume and Flavor Materials of Natural Origin (PFM) by Steffen Arctander, Published by Author 1960.
3. Merck Index (MI) 8th Edition, Published by Merck & Co., 1968.

The references describe only the unpurified products.

| GUM RESIN | REFERENCE | PAGE NUMBER |
|---|---|---|
| Damar | MI | 320 |
| Colophony (Rosin) | MI | 923 |
| Canada Balsam | PFM | 117 |
| Elemi | HFI | 108 |
| Galbanum | HFI | 118 |
| Labdanum | HFI | 142 |
| Myrrh | HFI | 170 |
| Olibanum | HFI | 178 |
| Opopanax | HFI | 180 |
| Peruvian Balsam | HFI | 196 |
| Sandarac | HFI | 221 |
| Storax | HFI | 231 |
| Tolu Balsam | HFI | 240 |
| Gurgun Balsam | PFM | 286 |
| Mastic | PFM | 402 |
| Copaiba | HFI | 93 |

Damar, Colophony (Rosin) and Canada balsam gum resins are used either in unpurified or purified form, but the taste of the purified form is preferable. Elemi and mastic, although somewhat more bitter, may also be used in unpurified form, particularly when a bitter taste may be desired as in "Bitter Lemon." The remaining gum resins are used only in purified form. Any of the gum resins listed may be substituted for elemi gum resin in Examples 1–14 making suitable allowance for variations in specific gravity. Also, it should be noted that different samples of an individual gum resin will vary in specific gravity. However, using conventional techniques component ratios can readily be adjusted so that the specific gravity of any of the balanced gum-resin oil blends of the present invention can be matched to that of the continuous phase of the beverage in which the balanced oil blend is to be dispersed. Moreover, to produce special flavors, it is possible to use combinations of flavors in a single balanced oil blend or to combine a plurality of balanced oil blends.

It will thus be seen that the objects set forth above among those made apparent from the preceding description, are efficiently attained and, since certain changes may be made in carrying out the above process and in the composition set forth without departing from the spirit and scope of the invention, it is intended that all matter contained in the above description and shown in the accompanying drawing shall be interpreted as illustrative and not in a limitng sense.

It is also to be understood that the following claims are intended to cover all of the generic and specific features of the invention herein described and all statements of the scope of the invention which, as a matter of language, might be said to fall therebetween.

We claim:

1. A balanced natural gum resin-oil blend suitable for use in the preparation of cloudy still and carbonated beverages, either aqueous or alcoholic, comprising at least one edible natural oil-soluble essentially water-soluble gum resin derived from a plant and having a density of at least about 1.04 g/ml and at leasdt one edible oil, said gum resin being selected from the group consisting of crude and purified damar, colophony, Canada balsam, elemi, and mastic, copaiba, galbanum, labdanum, myrrh, alibanum, opopanax, Peruvian balsam, sandarac, storax, tolu balsam, and gurgun balsam, and said oil being selected from the group consising of citrus oils both natural and synthetic, citrus terpenes, neutal edible oils and non-citrus natural and synthetic flavoring oils, said gum resin being in solution in said oil, the ratio of gum resin to oil being such that the density of the blend approximates that of the beverage to be prepared therefrom, thereby ensuring that the oil containing said natural oil-soluble gum resin dissolved therein will not settle out or form a ring when formulated into a beverage and stored in a container.

2. A balanced natural gum resin-oil blend as defined in claim 1, wherein the weight ratio of gum resin to oil lies in the range between about 750:250 and 500:500.

3. A balanced natural gum resin-oil blend as defined in claim 1, wherein the density of said blend lies in the range between about 0.98 and about 1.04 g/ml.

4. A balanced natural gum resin-oil blend as defined in claim 1, comprising 500–750 parts by weight of purified elemi gum resin and 250–500 parts by weight of orange oil.

5. A balanced natural gum resin-oil blend as defined in claim 1, comprising 500–750 parts by weight of purified elemi gum resin and 250–500 parts by weight of orange terpenes.

6. A balanced natural gum resin-oil blend as defined in claim 1, comprising 600–750 parts by weight of purified resinous elemi gum resin and 250–400 parts by weight of vegetable oil, said blend being neutral in taste.

7. A balanced natural gum resin-oil blend as defined in claim 1, comprising 350–750 parts by weight of purified elemi gum resin, 150–600 parts by weight of lemon oil California USP, 20–120 parts by weight lemon oil distilled and 10-80 parts by weight lemon oil Five-Fold.

8. A balanced cloud emulsion, comprising 50–200 parts of at least one balanced natural gum resin-oil blend as defined in claim 1, 180–300 parts by weight of an emulsion-stabilizing material selected from the group consisting of water-soluble gums and water-soluble starches, 450–650 parts by weight of water and 1–10 parts by weight of preservative, wherein said balanced natural gum-oil blend is in the form of droplets most of which by weight are in the range of about 0.5 to about 1.5 $\mu$.

9. A balanced cloud emulsion as defined in claim 8, wherein said water-soluble gum is selected from the group consisting of gum Arabic, and modified dextrin from waxy maize.

10. A beverage syrup comprising about ¼ 2 oz. of a cloud emulsion as defined in claim 8, per gallon of syrup.

11. A cloudy aqueous beverage comprising about 1 part beverage syrup as defined in claim 10, in a state of dispersion in 4 60 6 parts of water.

12. A non-aqueous balanced cloud solution suitable for preparing a beverage syrup comprising 50–100 parts by weight of a blend as defined in claim 1 in solution in 900–950 parts by weight of an alcohol selected from the group consisting of 95% ethyl alcohol, glycerol and propylene glycol.

13. An alcoholic beverage comprising 1 part of a beverage syrup as defined in claim 10 in combination with 3 to 6 parts of ethyl alcohol of suitable proof.

14. A beverage syrup comprising 1 to 4 oz. of nonaqueus solution as defined in claim 12 in one gallon of syrup.

15. A cloudy beverage comprising about 1 part of the cloudy beverage syrup defined in claim 14 in a dispersed state in 4–6 parts of water.

16. A dry mix suitable for preparing a beverage, comprising the dried cloud emulsion defined in claim 8, having a water content up to about 5%.

17. A dry mix as defined in claim 16, in combination with a suitable quantity of at least one sweetener selected from the group consisting of a saccharine, cyclamates and sugar, powdered color, dry edible acid, dextrose and dry flavor, the combination being termed a beverage powder.

18. A process of preparing a balanced natural gum resin-oil blend suitable for use in the preparation of cloudy still and carbonated beverages comprising the steps of heating at least one edible oil-soluble, essentially water-insoluble gum resin derived from a plant and selected from the group consisting of crude and purified damar, colophony, elemi, mastic, Canada balsam, copaiba, galbanum, labdanum, myrrh, olibanum, opopanax, Peruvian balsam, sandarac, storax, tolu balsam, and gurgun balsam, to as high as 170°F and adding at least one natural oil selected from the group consisting of citrus oils, both natural and synthetic citrus terpenes, neutral vegetable oils and non-citrus flavoring oils with agitation until said gum dissolves in said oil, the relative quantities of gum resin and oil being selected so that said blend has a pre-selected specific gravity.

19. A process of preparing a balanced cloud emulsion suitable for use in preparing a cloudy beverage comprising the steps of adding 50–200 parts of at least one balanced natural gum resin-oil blend prepared as defined in claim 18, 180–300 parts by weight of an emulsion-stabilizing material selected from the group consisting of edible water-soluble gums and edible water-soluble starches, 450–650 parts by weight of water and 1–10 parts by weight of preservative, and homogenizing said balanced natural gum resin-oil blend into droplets most of which by weight are in the range of about 0.5 to about 1.5μ.

20. A process of preparing a beverage syrup, comprising the step of combining about ¼ - 2 oz. of a cloud emulsion prepared as defined in claim 19 with one gallon of syrup.

21. A process of preparing a beverage syrup as defined in claim 20, further comprising the step of adding additional flavoring to one of said syrup and said beverage syrup.

22. A process of preparing a dry mix comprising the step of drying a balanced cloud emulsion prepared as defined in claim 19 by one of spray-drying, freeze-drying, drum-drying and Foam-mat-drying to a moisture content not greater than about 5%.

23. A process of preparing a beverage powder comprising the step of combining a sweetener, powdered color, dry edible acid, dextrose and a dry flavor with a dry mix as defined in claim 22, the relative quantities of the ingredients being selected to give the desired color and flavor.

24. A process of preparing a cloudy aqueous beverage comprising the step of combining a beverage powder as defined in claim 23, with water or carbonated water in a ratio 8 to 16 oz. of beverage mix to one gallon of water or carbonated water.

25. A process of preparing a non-aqueous balanced cloud solution comprising the steps of dissolving 50 to 100 oz. of natural resin gum-oil blend prepared as defined in claim 18 in 900 to 950 oz. of an alcohol selected from the group consisting of 95% ethyl alcohol, glycerol and propylene glycol.

26. The process as defined in claim 25 further comprising the step of adding 1 to 4 oz. of flavor material to one gallon of syrup, thereby preparing a beverage syrup.

27. A process of preparing a cloudy aqueous beverage from a balanced cloud emulsion prepared as defined in claim 19 comprising the step of adding ¼ to 2 oz. of balanced cloud emulsion to 5 to 7 gallons of sweetened flavored water.

28. A process of preparing a cloudy alcoholic beverage comprising the step of adding 1 part of beverage syrup prepared as defined in claim 20 to 3–6 parts of 32 proof ethyl alcohol.

29. The process as defined in clam 28 further comprising the step of adding up to 3 parts of water.

* * * * *